US009094400B2

(12) United States Patent
Barkie et al.

(10) Patent No.: US 9,094,400 B2
(45) Date of Patent: *Jul. 28, 2015

(54) AUTHENTICATION IN VIRTUAL PRIVATE NETWORKS

(71) Applicant: International Business Machines Corporation, Armonk, NY (US)

(72) Inventors: Eric J. Barkie, Cary, NC (US); Benjamin L. Fletcher, Elmsford, NY (US); Marco Pistoia, Amawalk, NY (US); John J. Ponzo, Yorktown Heights, NY (US); Andrew P. Wyskida, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 67 days.

This patent is subject to a terminal disclaimer.

(21) Appl. No.: 13/743,265

(22) Filed: Jan. 16, 2013

(65) Prior Publication Data

US 2013/0133043 A1  May 23, 2013

Related U.S. Application Data

(63) Continuation-in-part of application No. 13/095,437, filed on Apr. 27, 2011.

(51) Int. Cl.
*H04L 29/06* (2006.01)

(52) U.S. Cl.
CPC .......... *H04L 63/10* (2013.01); *H04L 63/0272* (2013.01); *H04L 63/0485* (2013.01); *H04L 63/101* (2013.01); *H04L 63/0876* (2013.01); *H04L 63/107* (2013.01)

(58) Field of Classification Search
CPC ... H04L 63/10; H04L 63/101; H04L 63/0485; H04L 63/0272; H04L 63/107; H04L 63/0876; H04L 63/08; H04L 63/20; H04L 63/164; H04L 12/4641

USPC ........................................................ 726/15, 4
See application file for complete search history.

(56) References Cited

U.S. PATENT DOCUMENTS 6,286,104 B1   9/2001 Buhle et al.
6,804,777 B2  10/2004 Hollis et al.
(Continued)

OTHER PUBLICATIONS

Yang et al. "Research and Design of the PMI-based Access Control Model for OpenVPN." International Conference on Advanced Intelligence and Awareness Internet (AIAI 2010), 2010, pp. 77-80.*
(Continued)

*Primary Examiner* — Mahfuzur Rahman
*Assistant Examiner* — Narciso Victoria
(74) *Attorney, Agent, or Firm* — Louis J. Percello; Ryan, Mason & Lewis, LLP

(57) ABSTRACT

Systems and methods are provided for controlling access to a network. An access request is received from a client application running on a computing device for accessing a remote network. The access request is received over a secure virtual private network (VPN) connection established by a user-mode VPN client running in non-privileged user space of the computing device. The access request includes contextual information for use in authenticating a user to access a remote network, wherein the contextual information includes contextual information about the client application requesting access to the remote network. An authentication process is performed using the contextual information to authenticate the user, and a secure VPN connection is established between the client application and the remote network, if the user is authenticated.

27 Claims, 11 Drawing Sheets

(56) References Cited

U.S. PATENT DOCUMENTS

| | | |
|---|---|---|
| 7,281,139 B2 | 10/2007 | Stewart |
| 7,665,132 B2 * | 2/2010 | Hisada et al. ............... 726/15 |
| 7,734,611 B2 | 6/2010 | Rowley et al. |
| 7,827,609 B2 | 11/2010 | Hong et al. |
| 7,945,946 B2 | 5/2011 | Rowley |
| 8,036,211 B1 | 10/2011 | Leeder et al. |
| 8,095,786 B1 | 1/2012 | Kshirsagar et al. |
| 8,127,350 B2 | 2/2012 | Wei et al. |
| 8,286,002 B2 | 10/2012 | Kamat et al. |
| 8,489,761 B2 * | 7/2013 | Pope et al. ............... 709/236 |
| 8,539,567 B1 | 9/2013 | Logue et al. |
| 8,627,410 B2 | 1/2014 | Hughes et al. |
| 2003/0074372 A1 | 4/2003 | Barchi et al. |
| 2004/0255164 A1 * | 12/2004 | Wesemann ............... 713/201 |
| 2005/0216485 A1 | 9/2005 | Bell et al. |
| 2007/0106699 A1 | 5/2007 | Harvey et al. |
| 2008/0034413 A1 | 2/2008 | He et al. |
| 2008/0046993 A1 | 2/2008 | Mullick et al. |
| 2008/0144625 A1 | 6/2008 | Wu et al. |
| 2009/0234953 A1 * | 9/2009 | Braslavsky ............... 709/227 |
| 2010/0100949 A1 | 4/2010 | Sonwane et al. |
| 2012/0072975 A1 * | 3/2012 | Labrador et al. ............... 726/6 |
| 2013/0198368 A1 | 8/2013 | Patterson et al. |
| 2013/0226689 A1 | 8/2013 | Nemitz et al. |
| 2013/0254849 A1 | 9/2013 | Alison et al. |
| 2014/0359710 A1 | 12/2014 | Chaput |

OTHER PUBLICATIONS http://openvpn.net/Index.php/open-source/downloads.html, Apr. 26, 2011, 2 pages.

* cited by examiner

400

AUTHENTICATION IN VIRTUAL PRIVATE NETWORKS

CROSS-REFERENCE TO RELATED APPLICATIONS

This application is a Continuation-in-Part of U.S. patent application Ser. No. 13/095,437, filed Apr. 27, 2011, the disclosure of which is incorporated herein by reference. This application is related to U.S. patent application Ser. No. 13/743,313, filed on Jan. 16, 2013, the disclosure of which is incorporated herein by reference.

TECHNICAL FIELD

This disclosure relates generally to systems and methods for authenticating virtual private network access requests and, in particular, to systems and methods for authenticating virtual private network access requests using virtual private network clients executing in unprivileged user space without root access to a computing device operating system.

BACKGROUND

Virtual Private Networks (VPNs) enable secure, encrypted communications between private networks and remote users through public telecommunications networks such as the Internet. Remote users typically establish VPN connections by using VPN client software that is closely tied to the operating system (OS) of their devices. Many companies that develop operating systems for devices do not publicly provide third-party developers access to low level native features of the OS, which is necessary for these developers to develop and implement VPN solutions that are compatible and properly function with the device OS. Consequently, VPN client software is usually provided by the OS developer and is not easily added by third parties.

Client software (both standard and third party solutions) usually requires special device privileges to create a VPN connection. For secure communications, VPN connections typically require root access to the device OS and direct access to the native TCP/IP stack and network communications stacks on the computing device. These severe restrictions are thought to be necessary to protect remote devices from malicious programs (viruses etc. . . . ) and to enable secure communications over a notoriously unsecure public network such as the Internet.

The dramatic rise in popularity of "smart" mobile devices (phones with access to the Internet) has resulted in a demand for VPN communications between these devices and secure private networks. Many of the most popular commercially available devices do not include a VPN client. The VPN clients that do exist typically suffer from reliability issues, significantly drain battery life, are limited to specific infrastructures, and/or offer a clunky user experience. Existing alternatives can help but often introduce security issues (e.g. reverse proxies) or are severely limited in utility.

Traditionally, desktop OS users have had fully privileged (root) authority and have had the choice to obtain a VPN client from either the OS developer or third party developers. Recently, security has tightened in the desktop space and has been especially restrictive from the start in the mobile device space. In this regard, the ability to gain root access and utilize third party developed clients has diminished.

Furthermore, with regard to VPN authentication, conventional VPN authentication protocols typically involve identifying a user requesting access to a VPN based on username/password or certificates or some other form of credentials, and applying an appropriate access control list (ACL) to the user. Some advanced VPN server/client technologies can additionally determine authentication/access based on the computing device that is used to request access to the VPN.

SUMMARY

Embodiments of the invention generally include systems and methods for authenticating virtual private network access requests and, in particular, to systems and methods for authenticating virtual private network access requests using virtual private network clients executing in unprivileged user space without root access to a computing device operating system.

In one embodiment of the invention, an access request is received from a client application running on a computing device for accessing a remote network. The access request is received over a secure virtual private network connection (VPN) connection established by a user-mode VPN client running in non-privileged user space of the computing device. The access request includes contextual information for use in authenticating a user to access a remote network, wherein the contextual information includes contextual information about the client application requesting access to the remote network. An authentication process is performed using the contextual information to authenticate the user, and a secure VPN connection is established between the client application and the remote network, if the user is authenticated.

Other embodiments of the invention will become apparent from the following detailed description, which is to be read in conjunction with the accompanying drawings.

DETAILED DESCRIPTION

Exemplary embodiments as described herein include systems and methods for establishing secure VPN communications using processes executing in unprivileged user space. More specifically, exemplary systems and methods according to aspects of the invention implement user-mode VPN clients and user-mode network protocol stacks (e.g., TCP/IP stacks) that operate in user space to establish secure VPN connections without the need for root access to an operating system of the computing device. By way of example, systems and methods for establishing secure VPN communications combine a user-mode VPN client and a user-mode TCP/IP stack into an integrated user-mode process that can operate in non-privileged user space, without root access to an operating system of the client. In one embodiment, the VPN connection utilizes Cisco infrastructure using 256-bit AES SSL. Because the VPN client and TCP/IP stack are integrated user-mode processes, the VPN communications require no privileged access and can be implemented on severely restricted mobile platforms, for example.

Figure 1A:
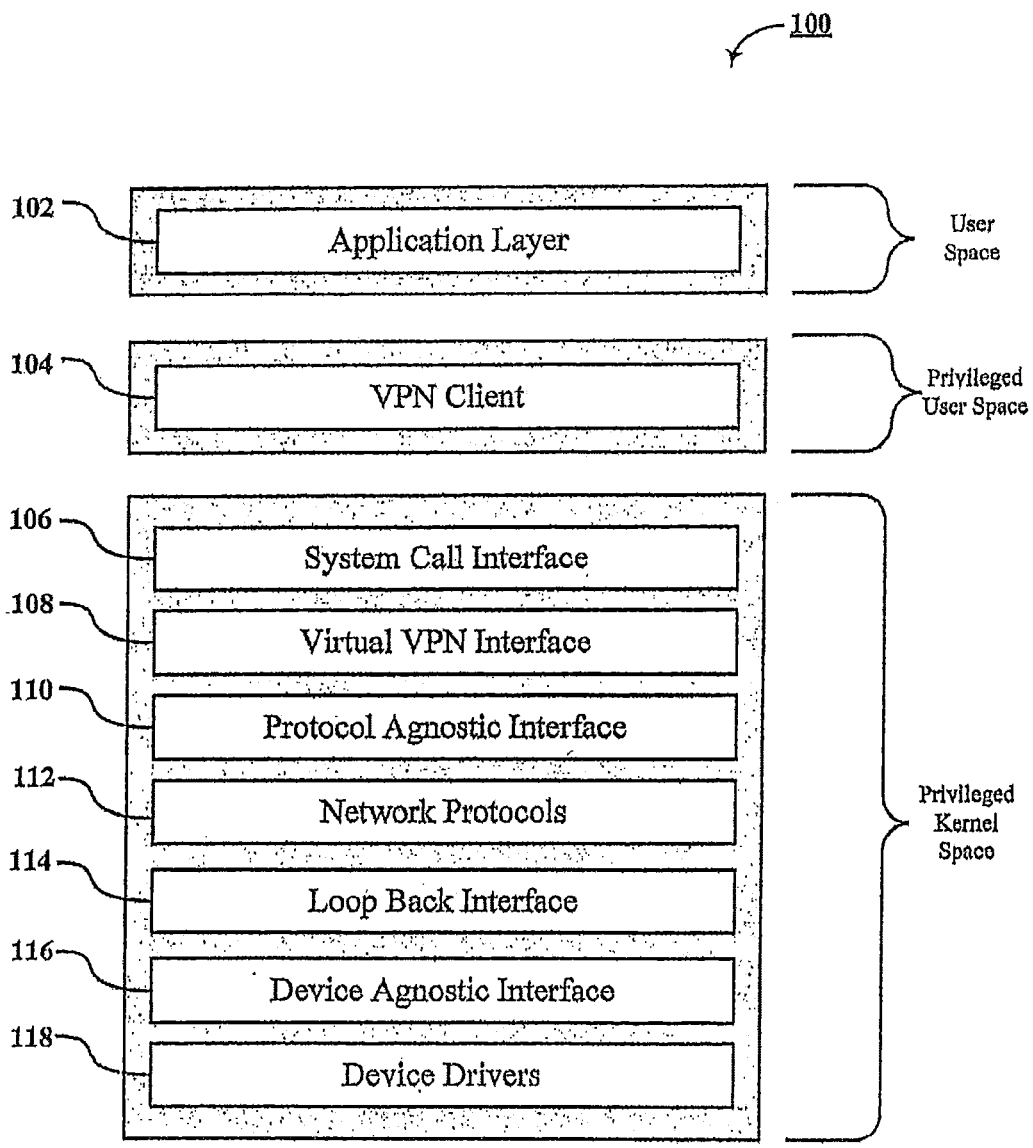
FIG. 1A is a block diagram illustrating a traditional application platform that executes on a computing device for implementing secure VPN communications using processes that operate in privileged user space and privileged kernel space with root access to an operating system of the computing device.

FIG. 1A is a block diagram illustrating a traditional application platform for implementing VPN communications on a computing device. More specifically, FIG. 1A is a block diagram illustrating a traditional application platform that executes on a computing device for implementing secure VPN communications using processes that operate in privileged user space and privileged kernel space with root access to an operating system of the computing device. As depicted in FIG. 1A, a conventional application platform 100 for implementing secure VPN communications comprises an application layer 102 that executes in non-privileged user space and a VPN client 104 that operates in privileged user space. The framework 100 further comprises a plurality of layers that execute in privileged kernel space such as a system call interface 106, a virtual VPN interface 108, a protocol agnostic interface 110, network protocols interface 112, a loop back interface 114, a device agnostic interface 116 and device drivers interface 118.

The application layer 102 represents any client application that operates in unprivileged user space, which makes use of the VPN client 104 for secure VPN communications. The VPN client 104 operates in privileged user space and communicates with application layers in privileged kernel space to provide secure VPN communications services to the application layer 102. The system call interface 106 is utilized by a process running in the non-privileged user space or the privileged user space to communicate with the privileged kernel space. The virtual VPN interface 108 is a virtual network device interface that is created with an internal device address when a VPN connection is established. The protocol agnostic interface 110 abstracts specifics of a virtual interface, and in particular, abstracts specifics of the network protocols layer 112. The network protocols layer 112 implements one or more native network communications stacks such as a native TCP/IP stack. The loopback interface 114 is a virtual network interface implemented in software which is integrated into the internal network infrastructure of the device. The device agnostic interface 116 implements the API to communicate with and write device drivers. The device drivers interface 118 implements APIs to communicate with kernel functions.

Figure 1B:
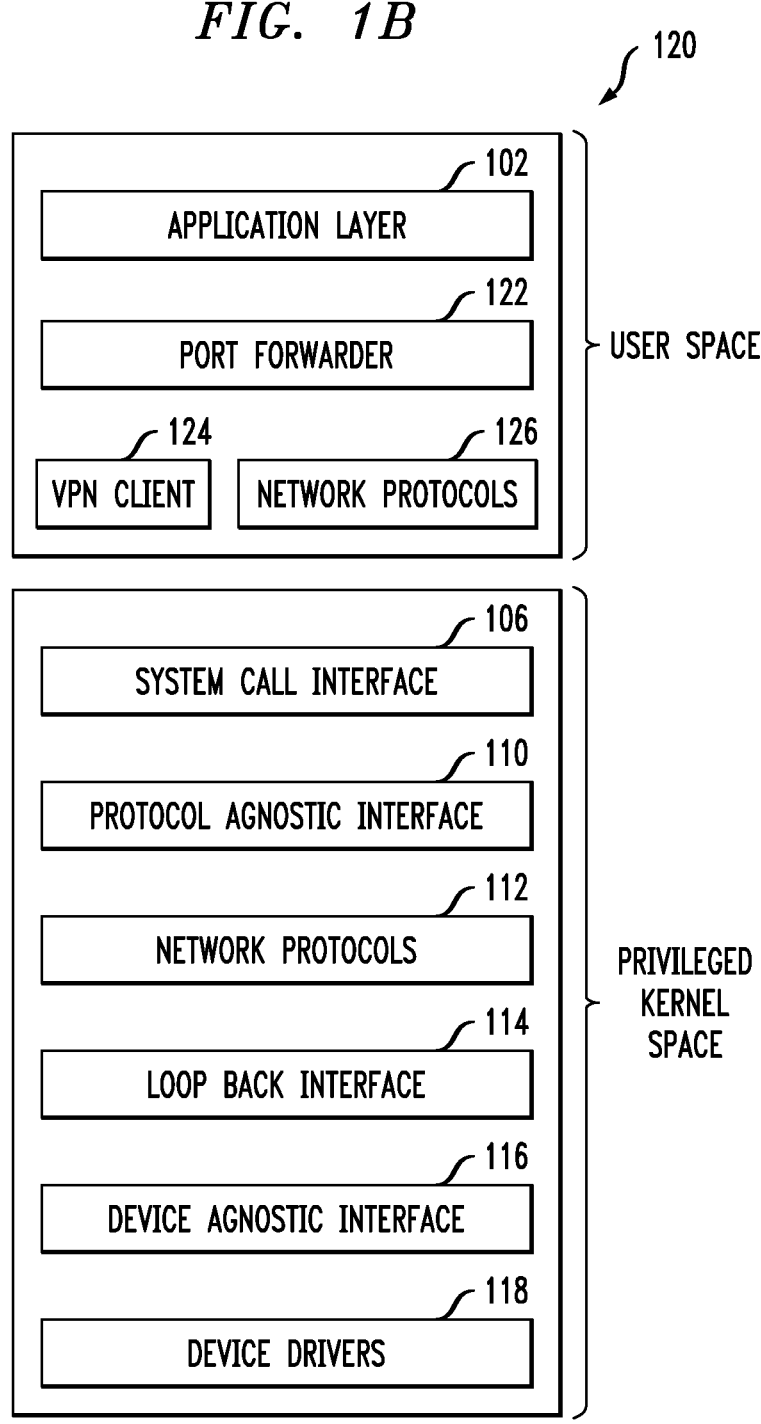
FIG. 1B is a block diagram illustrating an application platform that executes on a computing device for implementing secure VPN communications using processes that operate in non-privileged user space without the need for root access to an operating system of the computing device, according to an embodiment of the invention.

With the traditional model of FIG. 1A, either direct access or privileged access to the native OS is needed to establish secure VPN communications via the VPN client 104 and the virtual VPN interface 108. In contrast to the traditional model 100 of FIG. 1A, FIG. 1B is a block diagram illustrating an application platform that executes on a computing device for implementing secure VPN communications using processes that operate in non-privileged user space without the need for root access to an operating system of the computing device. The application platform 120 of FIG. 1B, is similar to the platform 100 of FIG. 1A, except that the platform 120 of FIG. 1B comprises a plurality of user-mode processes, including a port forwarder 122, VPN client 124 and network communication protocol stack 126, which operate in user space to establish secure VPN communications over a computer network.

With the exemplary application platform model 120 of FIG. 1B, neither direct access nor privileged access to the OS is needed to establish secure VPN connections. In accordance with aspects of the present invention, a virtual VPN interface is not established in privileged kernel space (as with the traditional model 100 of FIG. 1A), but rather, a loop back interface 114 of a native network protocol stack 112 (e.g., a native TCP/IP stack) is accessed and certain ports are assigned on the loopback interface 114 to reroute and intercept VPN traffic through the present invention which implements software functions for forwarding VPN traffic through the loopback interface 122 and for creating a VPN client 124 and a TCP/IP network protocol stack 126 which operate in user space. With the exemplary model 120 of FIG. 1B, the VPN client 124, network protocol stack 126 (e.g., TCP/IP stack), and port forwarding functionality 122 are integrated user-mode processes in non-privileged user space. VPN network communications from the intranet to the application are controlled by the port forwarder 122 which reroutes secure VPN network traffic from the native TCP/IP stack 122, through the local loopback interface 114 to the TCP/IP stack in user space 126 where the application layer 102 can access the data. VPN communications from the application 102 to the intranet are written to the TCP/IP stack in user space 126 where the VPN traffic is rerouted by the port forwarder 122 through the loopback interface 114 to the native TCP/IP stack 122. In this regard, the application accesses a non-privileged stack in user space where the application does not need root access to the OS.

Figure 2:
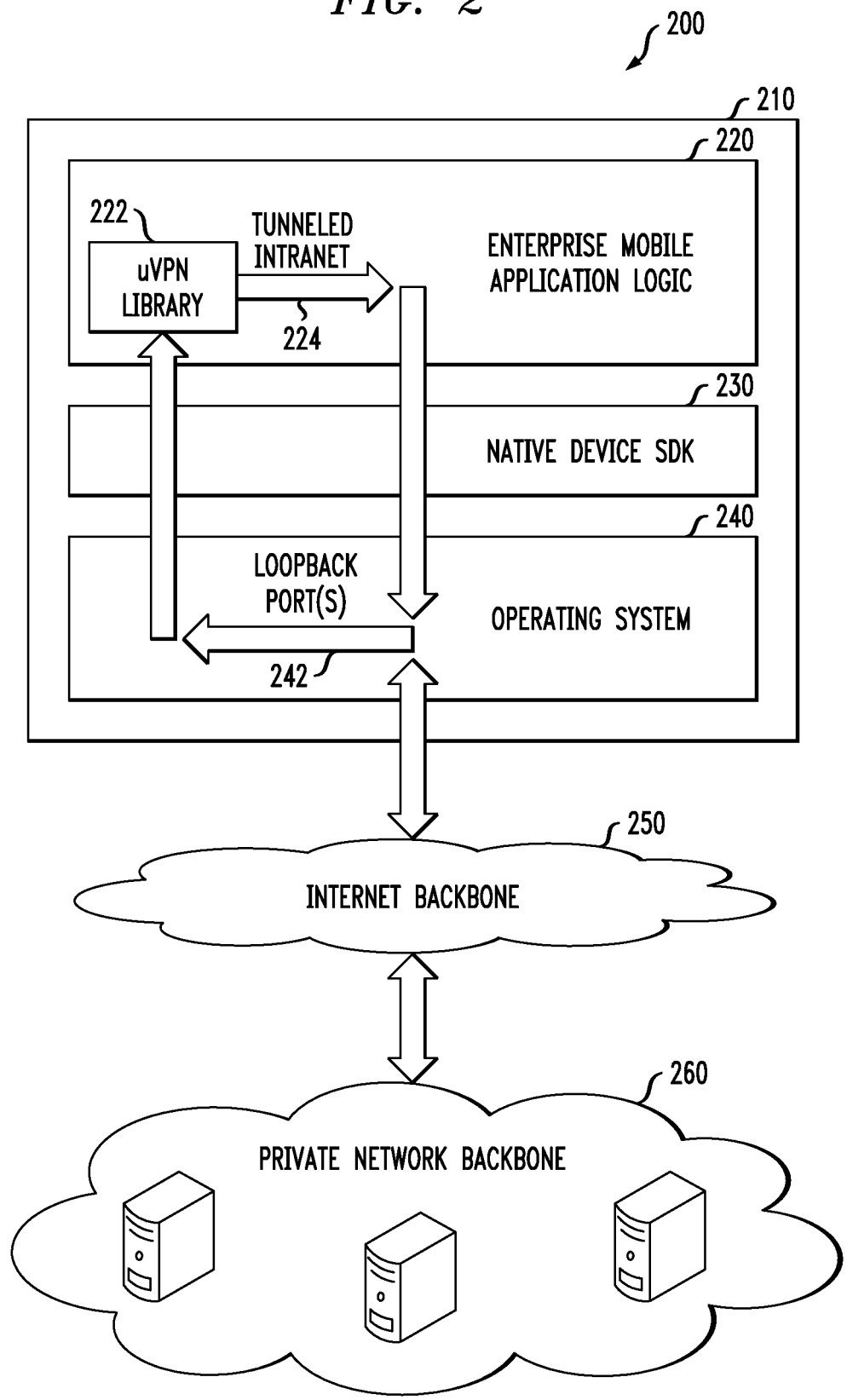
FIG. 2 is a block diagram of a system for enabling secure VPN communications with a computing device having processes that operate in non-privileged user space to establish secure VPN communications without the need for root access to an operating system of the computing device, according to an embodiment of the invention.

FIG. 2 is a block diagram of a system for enabling secure VPN communications, according to an exemplary embodiment of the invention. The system 200 comprises a computing device 210 that generally includes a client application 220, native device SDK (software developer kit), and a device operating system 240. The native device SDK 230 comprises a plurality of APIs that a Developer can utilize to access various features of the computing device 210. The computing device 210 can be mobile phone, mobile computing device, laptop computer, desktop computer, etc., which can implement the application platform model as depicted in FIG. 1B. The computing device 210 can access a communications network 250 (e.g., the internet), and access a private network 260 via secured VPN network connections over the communications network 250.

The application logic 220 comprises a VPN library 222 which comprises a plurality of functions that are used to initiate, open, control and close VPN connections in non-privileged user space. The VPN library 222 is a portable function library that can be embedded into any application logic, rather than being stand-alone software. The portable function library 222 is compatible with many different platforms, including, but not limited to Mac OSX, iOS, UNIX/Linux and Android platforms. In one exemplary embodiment of the invention, the VPN library 222 combines a user-mode VPN client and a user-mode TCP/IP network stack as an integrated user-mode process in user space. The library modules run in user space because the VPN client and the TCP/IP stack are not in the low level OS space, but rather they are implemented in the function library. The VPN library 222 also includes various functions to establish, disconnect, and query the VPN connectivity state.

Figure 3:
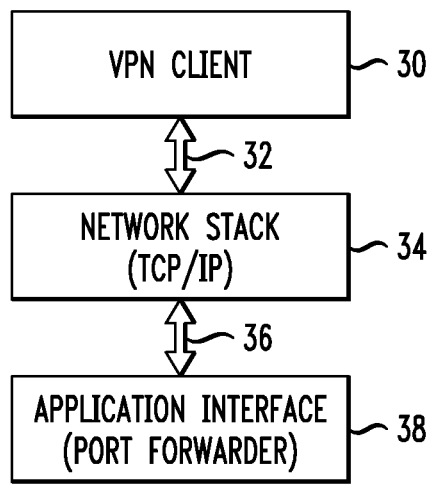
FIG. 3 is a block diagram of system processes that operate in non-privileged user space of a computing device for enabling secure VPN communications without the need for root access to an operating system of the computing device, according to an embodiment of the invention.

In particular, in one exemplary embodiment of the invention, the VPN library 222 comprises functions and routines for establishing system processes such as depicted in FIG. 3, which operate in non-privileged user space of a computing device for enabling secure VPN communications. As shown in FIG. 3, a user-mode VPN client 30 communicates with a user-mode network stack (TCP/IP stack) using a communication protocol 32, and the user-mode network stack (TCP/IP stack) 34 communicates with the application interface (port forwarder) 38 using communication protocol 36. In one exemplary embodiment of the invention, the user-mode VPN client 30 and user-mode TCP/IP stack 34 are open source applications that are tied together with proprietary code to implement the functions in user space and provide a set of function calls to establish communication with a gateway (e.g. Cisco gateway). The user-mode TCP/IP stack 34 is a lightweight stack that functions like a native stack, but can be controlled in user space.

The communication protocol 32 may be implemented with one of various methods sufficient to establish layer 3 communications between the VPN client 30 and the user-mode TCP/IP stack 34. In one exemplary embodiment as discussed in detail below, the communication protocol 32 can be implemented using domain socket file descriptors. Moreover, the communication protocol 36 may be implemented with one of various methods sufficient to handle traffic between the user-mode TCP/IP 34 stack and the application interface 38, which ideally do not require special privileged access to the device OS. For instance, in one exemplary embodiment of the invention as discussed in detail below, a loopback method is employed to handle traffic between the user-mode TCP/IP 34 stack and the application interface 38. More specifically, in one exemplary embodiment, a loopback method is implemented using a TCP port forwarder process 38, wherein TCP ports are allocated on the OS loopback interface and mapped to internal target host and ports.

In accordance with an exemplary embodiment of the invention, with reference again to FIG. 2, normal internet traffic will flow between the application 220 and the internet 250 using the native network communications stack of the OS 240. However, Intranet traffic or VPN traffic between the application 220 and the private network 260 will be intercepted and forwarded through the Loopback Interface 242 through the VPN library 222 and out as tunneled Intranet traffic 224 to the application 220. In this regard, the application 220 accesses Intranet or VPN traffic on the loopback interface. As noted above, in accordance with aspects of the present invention, a virtual VPN interface is not established in privileged kernel space, but rather, the loop back interface 242 of the native TCP/IP stack of the OS 240 is accessed and certain ports are assigned on the loopback interface 242 to reroute and intercept VPN or Intranet traffic through the VPN library 222.

The VPN network traffic data that is generated by the application 220 and which needs to be secured for VPN communication is passed to the user-mode VPN client 30 where data is encrypted and encapsulated into VPN secured packets and re-addressed to the VPN gateway. Then the encrypted packets are passed to the user-mode TCP/IP stack 34 and re-routed through the loopback interface 242 by the port forwarder 38 to the native communications stack of the OS 240 where the packets are transmitted by the native TCP/IP stack to the private network 260. The user-mode TCP/IP stack 34 is used to communicate between the application layer 220 and the local loop back interface 242. The native TCP/IP stack is used to transmit VPN data traffic from the loopback interface 242 to the private network 260 through the interne 250.

The VPN library 222 monitors the native TCP/IP stack for traffic from a specific intranet IP address that the application 220 wants to communicate with. The application developer specifies a port on the loopback interface for traffic from this IP address to be forwarded to and then monitors it for traffic. Traffic from the target IP address is intercepted from the native TCP/IP stack by the VPN library 222, decrypted, then forwarded to the port on the loopback interface that the application developer has assigned for that traffic and the developer accesses the decrypted VPN traffic there. When the developer transmits traffic to the specified IP address, the developer writes the data to the assigned port on the loopback interface. Traffic flows between the application 220 and the intranet website through this specific port on the loopback interface 242.

Figure 4:
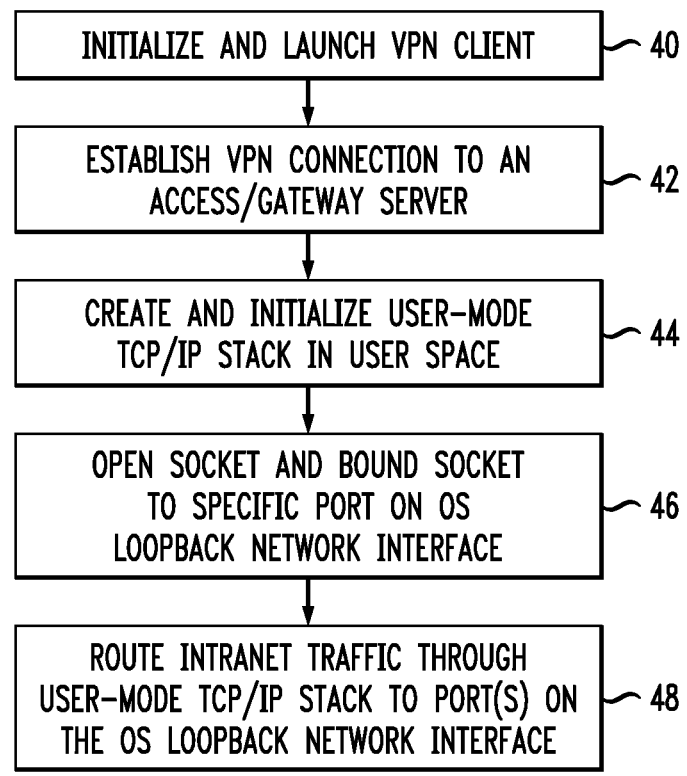
FIG. 4 is a high-level flow diagram of a method for enabling secure VPN communications using processes that operate in non-privileged user space on a computing device without the need for root access to an operating system of the computing device, according to an embodiment of the invention.

FIG. 4 is a high-level flow diagram of a method for enabling secure VPN communications without privileged root access to a device operating system, according to an exemplary embodiment of the invention. Referring to FIG. 4, initially, a client application with an embedded VPN library is initialized and launched in user space as a non-privileged user (step 40). A VPN connection is then established to an access server (step 42). In this process, the client application calls the VPN library and calls the appropriate functions to establish a VPN connection using the user-mode VPN client. In one exemplary embodiment, a VPN connection is established with the user-mode VPN client using an SSL VPN protocol. A user-mode TCP/IP stack is created and initialized in user space (step 44). A socket is opened and bound to a specific port on the OS loopback network interface (step 46). With this process, the client application listens to a port on the loopback interface for intranet traffic from a given intranet website, wherein the socket is a "tunnel" to the intranet site. Intranet traffic is then routed through the user-mode TCP/IP stack (rather than the OS native TCP/IP stack) to the specified port(s) on the OS loopback network interface (step 48).

With the process of FIG. 4, because both the VPN client and the TCP/IP stack are integrated user-mode process(es), the client software does not require privileged access to the device OS. This scheme provides several benefits. For example, the scheme enables the use of the client software on severely restricted platforms like the iPhone and Android which would otherwise require special privileged access to the OS in order to perform the same functionality. Moreover, this scheme provides a secure, efficient VPN solution for platforms that currently do not have one. Moreover, the scheme provides a highly portable VPN client that can be used on desktops, kiosks, etc., without the installation of any software or device drivers.

Figure 5:
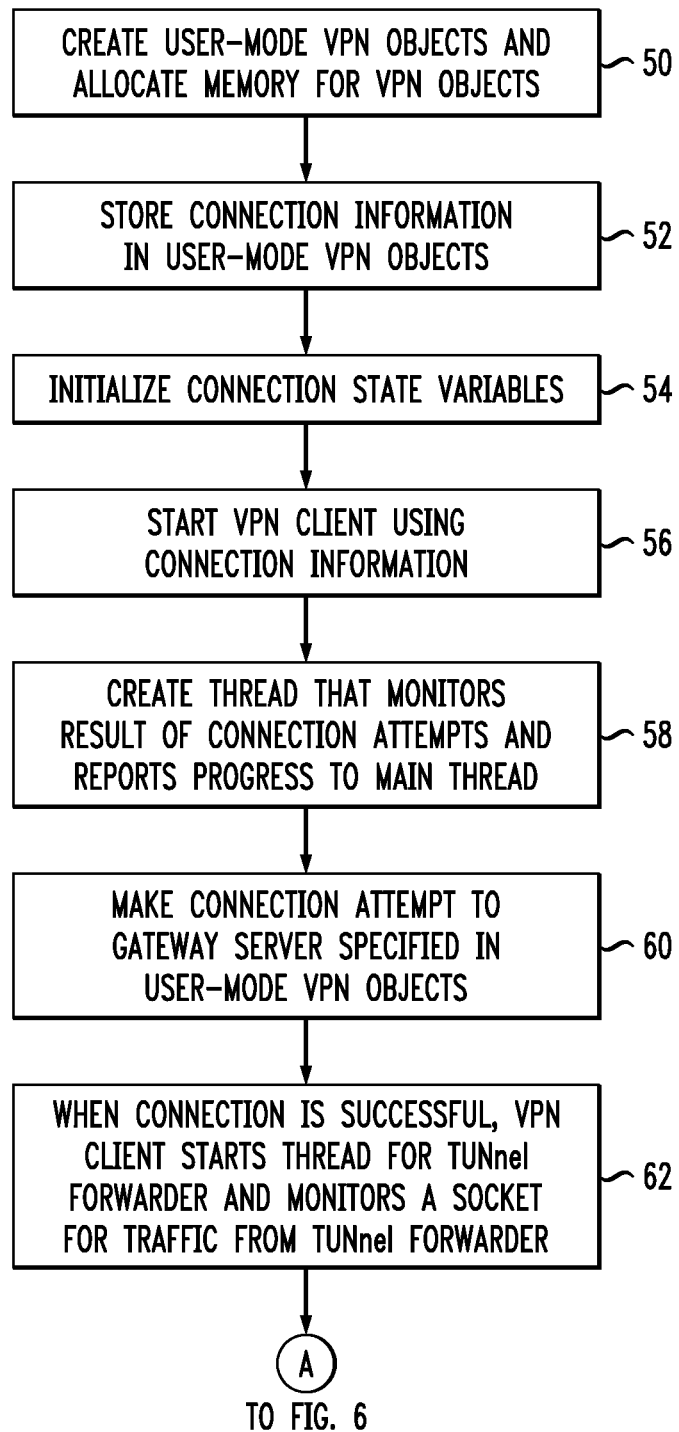
FIGS. 5, 6, and 7 depict a flow diagram of a method for enabling secure VPN communications using processes that operate in non-privileged user space on a computing device without the need for root access to an operating system of the computing device, according to another embodiment of the invention.
Figure 6:
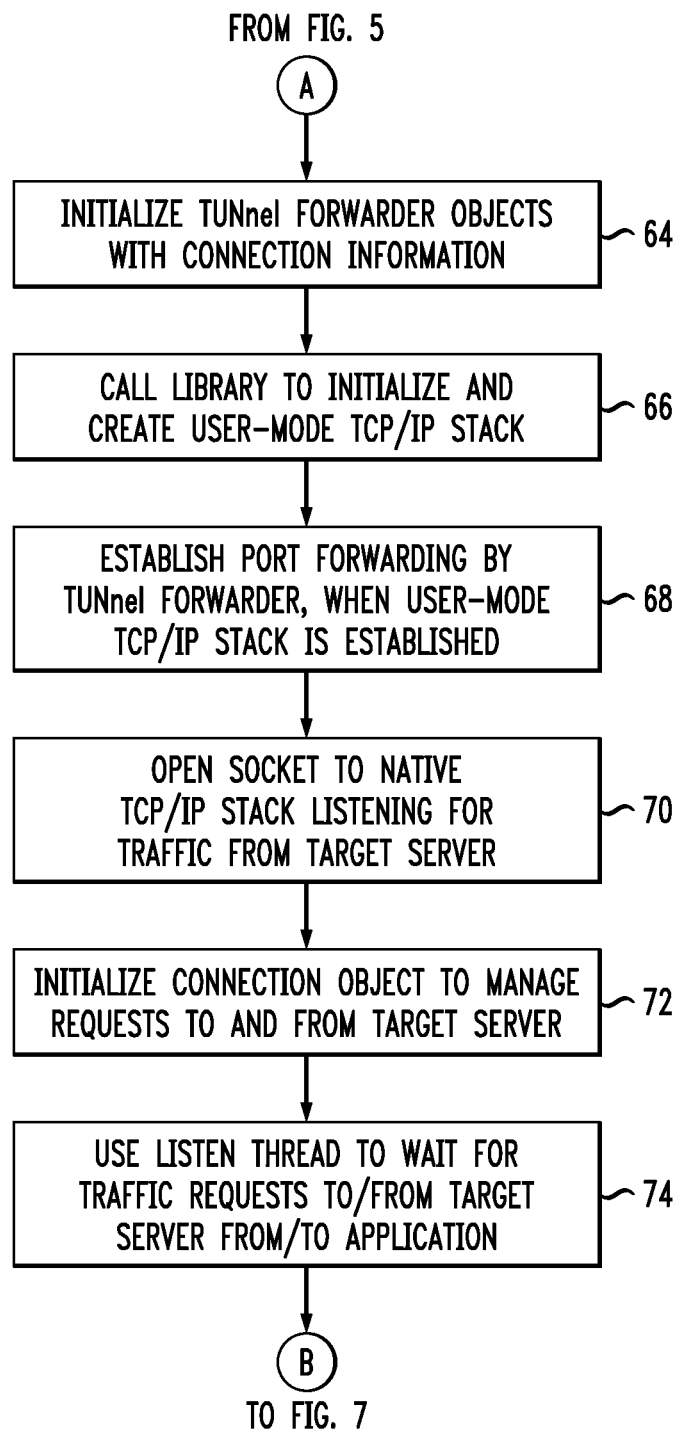
Figure 7:
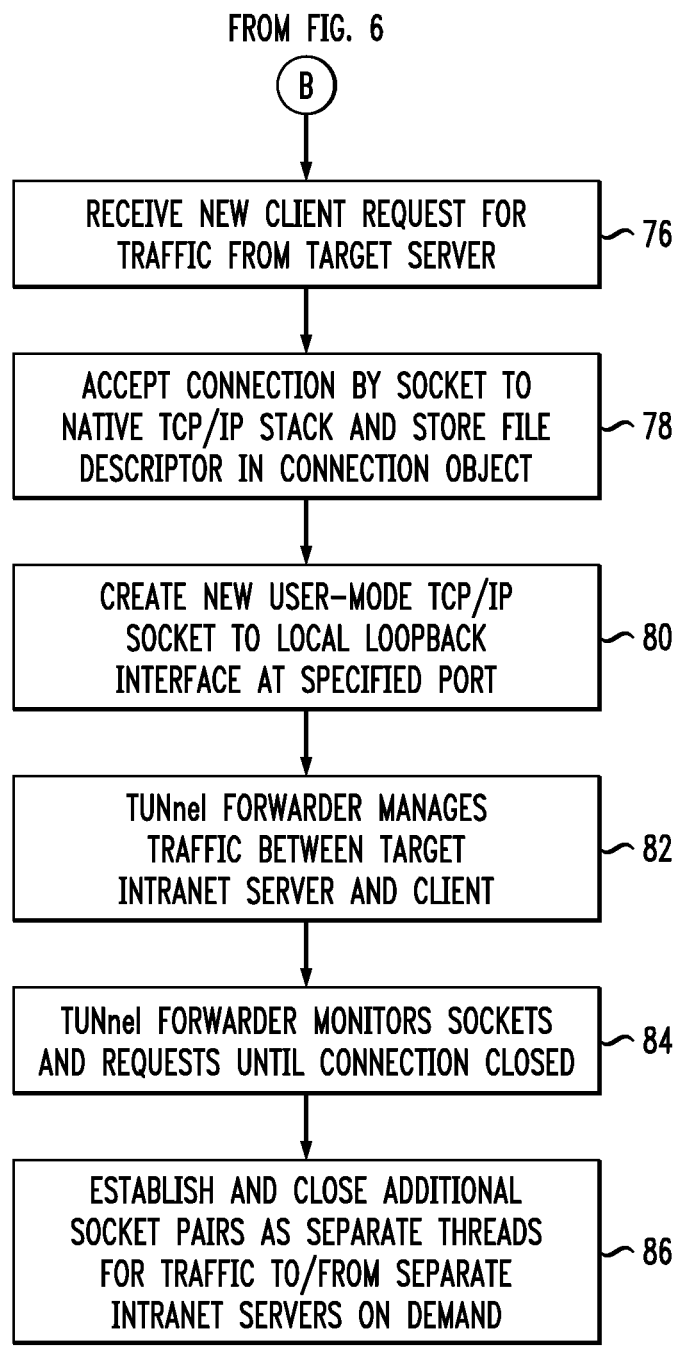

FIGS. 5, 6, and 7 depict a flow diagram of a method for enabling secure VPN communications without privileged root access to a device operating system, according to another exemplary embodiment of the invention. In particular, FIGS. 5, 6 and 7 illustrate a more detailed embodiment of various processing steps discussed above with reference to FIG. 4. For example, steps 50, 52, 54, 56, 58, 60 and 62 of FIG. 5 provide details of steps 40 and 42 of FIG. 4, according to another exemplary embodiment of the invention.

When the client application is launched, an initialization process is performed wherein a plurality of VPN objects are created and memory is allocated for the VPN objects (step 50). More specifically, when the client application is launched, the application will call a "start VPN" function included in the VPN library. This function passes into the library various types of connection information to be stored in the VPN objects. The connection information includes, for example, an IP address of a gateway server, a user name, and password, an address of an intranet server to establish a VPN connection with, and a port number of a port on the local loopback interface to which traffic is forwarded. This connection information is passed into the VPN library and the connection information is stored in the VPN objects (step 52). Thereafter, connection state variables are initialized to commence a VPN connection (step 54).

Next, an attempt is made to create a VPN connection. In one exemplary embodiment, the application calls an "open connection" function in the VPN library which causes a user-mode VPN client to be initialized and started using the connection information stored in the VPN objects (step 56). The user-mode VPN client is a fully functional VPN client which is launched by the VPN library to establish a connection to the gateway server that is specified in the connection information stored in the VPN objects. With this connection process, a thread is created to monitor the results of the connection attempt and reports the progress to the main thread (step 58). The user-mode VPN client will attempt to connect to a gateway server specified in the connection information (step 60).

When the connection attempt is successful, the user-mode VPN client will start a thread for TUNnel Forwarder (a user-mode process of the VPN library which handles port forwarding) and monitor a socket for traffic from TUNnel Forwarder (step 62). With this process, a new thread is spawned and detached from the main process, to execute the TUNnel Forwarder library function code.

After the TUNnel Forwarder is commanded to start in its own thread, a port is opened to a target intranet server. In one exemplary embodiment, steps 64, 66 and 68 illustrate an exemplary process flow for opening a port to a target Intranet server. Initially, TUNnel Forwarder objects are initialized with connection information (step 64). The VPN library is then called to initialize and create a user-mode TCP/IP stack (step 66). The TUNnel Forwarder thread will then establish port forwarding when the user-mode TCP/IP stack is successfully established (step 68).

After port forwarding is established, traffic flow will be established through the port forward process. In one exemplary embodiment, steps 70, 72 and 74 illustrate an exemplary process flow for controlling traffic flow through a user-mode port forwarding process. Initially, a socket is opened to the native TCP/IP stack listening for traffic from the target Intranet server (step 70). A connection object is then initialized to manage requests to and from the target Intranet server (step 72). Listen thread then waits for traffic requests to/from the target intranet server from/to the application (step 74). In other words, with the process, a socket is opened to a native TCP/IP stack, and information to a specific address is tunneled from the native TCP/IP stack to the TUNnel Forwarder thread. When traffic goes to or comes from a specific target address through the native TCP/IP stack, the traffic is forwarded to the TUNnel Forwarder process. The TUNnel Forwarder object stores information about the socket, and can subsequently initialize information about the connected port when information is passed to the port from the server.

Next, a new client connection request may be received, wherein a new client (unique IP, application request) requests traffic from target server (step 76). The connection is accepted by the socket to the native TCP/IP stack and a file descriptor is stored in a connection object (step 78). A new user-mode socket is created to the local loopback interface at the port specified by the connection information stored in the VPN objects (step 80).

Thereafter, the TUNnel Forwarder process manages traffic between target Intranet server and client application (step 82). In this step, the TUNnel Forwarder process listens to the user-mode TCP/IP stack and the native TCP/IP stack and waits for requests from either stack and handles the requests. With application requests, the information will be routed from the user-mode TCP/IP stack to the native TCP/IP stack and the traffic is sent to the Intranet server, and vice versa. The TUNnel Forwarder process monitors sockets and requests until the connection is closed (step 84). Additional socket pairs can be established and closed (native user-mode TCP/IP sockets) as separate threads for traffic to/from separate Intranet servers on demand (step 86).

Accordingly, in the exemplary embodiments discussed above, as depicted in FIG. 2, the VPN library code 222 acts as an intermediary between the native TCP/IP stack of the OS 240 and the application 220, which allows the application 220 to access information that would normally require privileged access. For normal Internet traffic flow, the application 220 uses the native network stack and passes traffic to and from the native stack. For special Intranet traffic that requires a VPN connection, the TUNnel Forwarder process of the VPN library 222 forwards traffic through the VPN library 222 through a socket between the native TCP/IP stack and the user-mode TCP/IP stack process of the VPN library. The VPN library 222 talks to a server on the Intranet 260 and talks to the application 220. If the application 220 sends traffic to the intranet server, a connection is established between the application and the TUNnel Forwarder process (if a pre-existing connection does not exist). The application writes data to the user-mode TCP/IP stack which is handled by the TUNnel Forwarder process. The intranet server TUNnel Forwarder reroutes the network traffic to the local loopback interface. Therefore, the application developer communicates through a user-space artificial TCP/IP stack where the application does not require privilege, wherein the intranet server talks normally to the native TCP/IP stack, except that the traffic going through the specific server is routed through the code in both directions.

Figure 8:
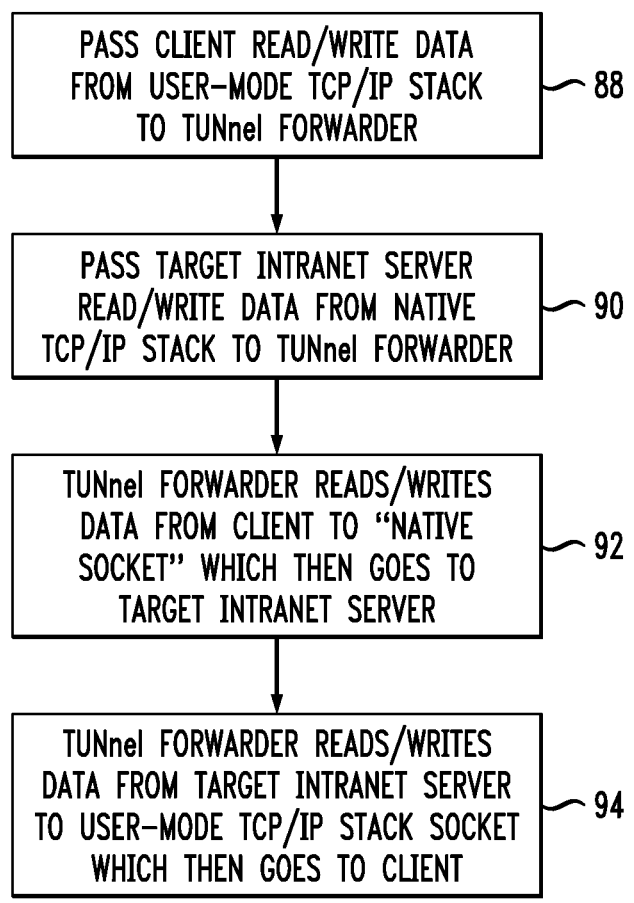
FIG. 8 is a flow diagram illustrating a method for managing traffic between a target Intranet server and a client application using a port forwarding user-mode process, according to an embodiment of the invention.

FIG. 8 is a flow diagram illustrating a method for managing traffic between a target intranet server and a client application using a port forwarding user-mode process, according to an exemplary embodiment of the invention. More specifically, FIG. 8 illustrates various steps that the TUNnel Forwarder process performs (in step 82 of FIG. 7) for managing traffic between a target Intranet server and the client application. Client read/write data is passed from the user-mode TCP/IP stack to the TUNnel Forwarder process (step 88). Target Intranet server read/write data is passed from the native TCP/IP stack to the TUNnel Forwarder process (step 90). The TUNnel Forwarder process reads/writes data from the client application to a "native socket" which then goes to target Intranet server (step 92). The TUNnel Forwarder process reads/writes data from the target Intranet server to a "user-mode socket" which then goes to the client application (step 94).

As discussed above with reference to FIG. 3, the user-mode VPN client 30 communicates with the user-mode network stack (TCP/IP stack) using a communication protocol 32, and the user-mode network stack (TCP/IP stack) 34 communicates with the application interface (port forwarder) 38 using communication protocol 36. The communication protocol 32 may be implemented with one of various methods sufficient to establish layer 3 communications between the VPN client 30 and the user-mode TCP/IP stack 34. For instance, in one exemplary embodiment as discussed above, the communication protocol 32 can be implemented using domain socket file descriptors. As is known in the art, a socket is a pipe with a file descriptor assigned to each end of the pipe and each file descriptor is an assigned file number, where data is written to/read from each descriptor at the end of the pipe. This scheme follows the TUN interface model discussed above, so any VPN client that leverages TUN interfaces can be readily adapted in this manner.

In another exemplary embodiment, the communication protocol 32 between the user-mode VPN client 30 and the user-mode TCP/IP stack 34 can be implemented using pipes. This scheme is similar to a socket scheme, but a pipes communication scheme creates a matching pair of file descriptors. The TCP/IP stack 34 writes to one descriptor and the data comes out the other end to the VPN client 30 at the other file descriptor and vice versa.

In another exemplary embodiment, the communication protocol 32 between the user-mode VPN client 30 and the user-mode TCP/IP stack 34 can be implemented using transport layer interface communications which makes use of data streams rather than file descriptors (in pipes and socket schemes). With this process, data streams are passed between two processes, rather than writing to memory or using file descriptors to read and write from files. In another exemplary embodiment, the communication protocol 32 between the user-mode VPN client 30 and the user-mode TCP/IP stack 34 can be implemented by using UNIX System V interprocess messaging primitives, which makes use of shared memory and a system of semaphores to signal when memory is in use.

Furthermore, as noted above, the communication protocol 36 may be implemented with one of various methods sufficient to handle traffic between the user-mode TCP/IP 34 stack and the application interface 38, which ideally do not require special privileged access to the device OS. For instance, various loopback methods may be employed to handle traffic between the user-mode TCP/IP 34 stack and the application interface 38. More specifically, in one exemplary embodiment, as discussed above, a loopback method is implemented using a TCP port forwarder process, wherein TCP ports are allocated on the OS loopback interface and mapped to internal target host and ports. Traffic is passed through (unmodified). This method is most useful for adapting to existing applications because it simply requires assigning a new URL and requires either little or no code changes. In another exemplary embodiment, a loopback method may be implemented using a UDP port forwarder process. This process is similar to the port forwarding process via the loopback interface, but is a different communication protocol (UDP instead of TCP/IP).

In another exemplary embodiment, a loopback process may be implemented using a DNS interception process. This process requires privileged access (to listen on port 53 and creates 127.0.0.0/8 aliases, and forwards on ports <1024). This scheme implements a DNS server, wherein requests are read, requested host are resolved internally, and then port forwards are automatically set up for the most common services on new 127.0.0.0/8 addresses. For example, assume a user requests access to w3.ibm.com, internal resolution shows that the real host is 10.0.0.1, so the following port forwards are setup:

127.0.0.2:22->XXX.XXX.XXX.XXX:22
127.0.0.2:80->XXX.XXX.XXX.XXX:80

Then the resolver returns 127.0.0.2 as the host. In addition, DNS TTL is used to tear down connections after a certain timeout period.

In another exemplary embodiment, the communication protocol 36 to handle traffic between the user-mode TCP/IP 34 stack and the application interface 38 may be implemented using a file accessor scheme. In particular, rather than use the loopback interface method as a connection mechanism, filed can be used wherein a FIFO protocol allows data to be read from and written to a file, and then pass it through the user-mode TCP/IP stack to the VPN client. By way of example, the application interface API is used to setup a domain socket (accessed as a file), for example:

$f->createDomainSocket("/tmp/myforward", 0600, IPTCP, "XXXXXX.XXX.XXX", 80);

Then, normal file operations can be used to read/write traffic with the remote host, for example:

```
$fd = fopen("/tmp/myforward", "r");
fwrite($fd, "hello world");
print stream_get_contents($fd);
fclose($fd).
```

In another exemplary embodiment, the communication protocol 36 to handle traffic between the user-mode TCP/IP 34 stack and the application interface 38 may be implemented using proxy servers (SOCKS, web, FTP, RTSP, gopher, etc.). In addition, the communication protocol 36 can be implemented by direct access to the user-mode TCP/IP stack. This is primarily for applications that are written directly for the user-mode uVPN communication scheme.

The embodiments discussed herein provide a VPN framework in which VPN communications occur exclusively within a single process running in the application layer, wherein the VPN communications do not require privileged access to the operating system, and wherein the VPN communications are implemented on a per application basis for each user-mode VPN enabled application operating on a given computing device. The user-mode VPN framework enables a unique method for authenticating VPN connectivity requests according to finer granularity of authentication criteria based on contextual information associated with the user, the computing device, as well as the client application requesting VPN connectivity. The additional granularity enables a novel ability to provide application/user/device specific network access control lists. Systems and methods for authenticating virtual private network access requests according to embodiments of the invention will now be discussed in further detail with reference to FIGS. 9, 10, and 11.

Figure 9:
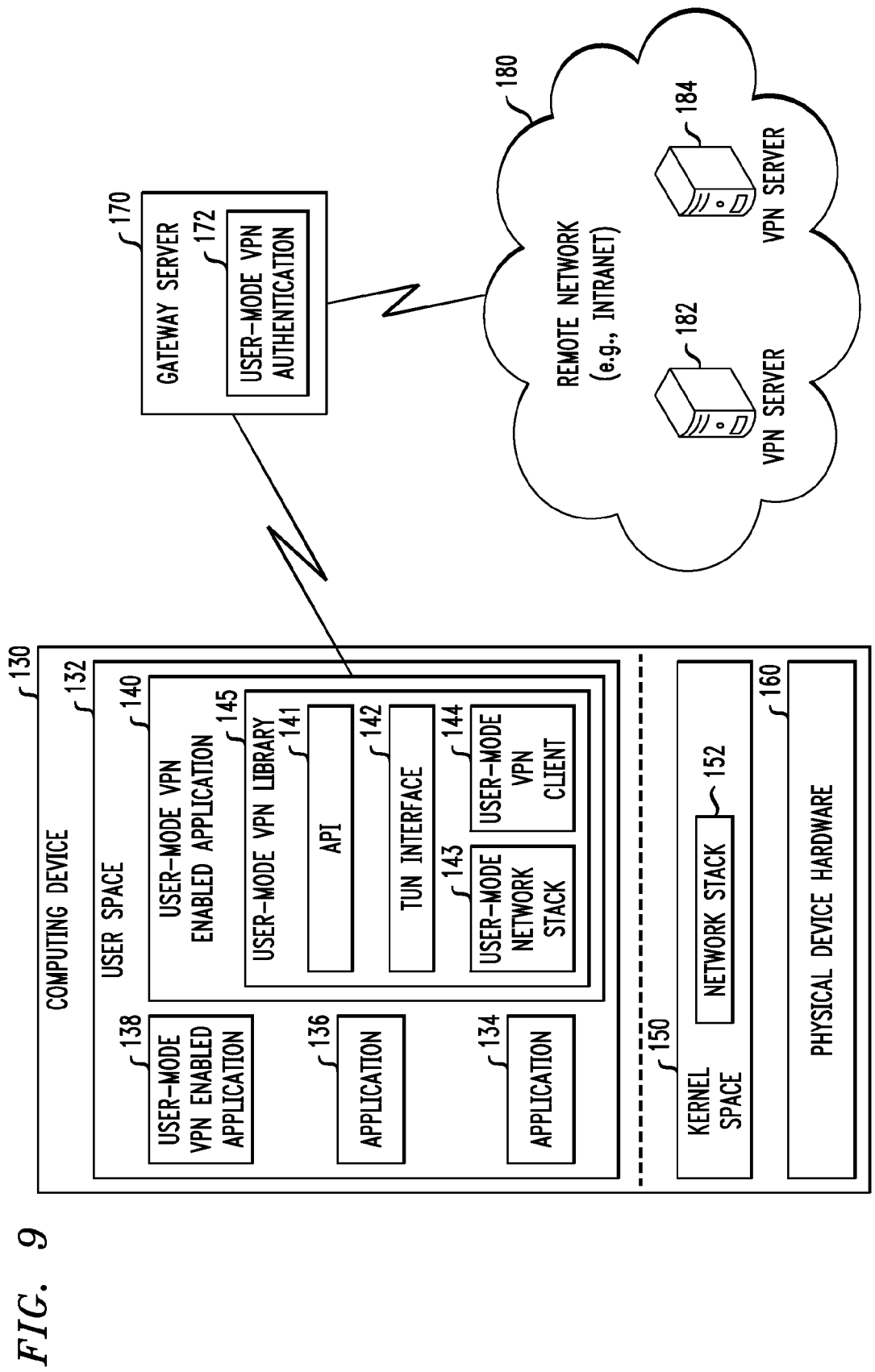
FIG. 9 is a block diagram of a system for authenticating virtual private network access requests according to an embodiment of the invention.

FIG. 9 is a block diagram of a system for authenticating virtual private network access requests according to an embodiment of the invention. In particular, FIG. 9 illustrates a system for authenticating virtual private network access requests received from a computing device utilizing user-mode virtual private network clients executing in unprivileged user space, according to an embodiment of the invention. A system shown in FIG. 9 comprises a computing device 130, a gateway server 170 and a remote VPN network 180. The computing device 130 comprises a user space 132 in which a plurality of conventional applications 134 and 136 and user-mode VPN enabled applications 138 and 140 are executed. The computing device 130 comprises a kernel space 150 of the device operating system in which various modules execute including a network communications stack 152 (e.g., TCP/IP), and physical device hardware 160 controlled by the operating system. The computing device 130 may be a laptop computer, a mobile smart phone, an electronic tablet (e.g., iPad), etc.

Each user-mode VPN enable application 138 and 140 comprises a user-mode VPN library as discussed above with reference to FIG. 3, for example. As specifically shown in FIG. 9, the user-mode VPN enabled application 140 comprises an embedded user-mode VPN library 145. The user-mode VPN library 145 comprises program code for implementing an API (application program interface) 141, a tunneling (TUN) interface 142 (or port forwarder interface), a user-mode network communications stack 143 (e.g., user-mode TCP/IP stack) and a user-mode VPN client 144. The application programming interface 141 exposes the functionality of the various modules 142, 143 and 144 of the user-mode VPN library 145, which modules 142, 143 and 144 have the same or similar functionalities as previously discussed.

The remote network 180 (e.g., intranet) comprises a plurality of servers 182 and 184 that implement an application or service that is accessed by the one or more applications running on the computing device 130. The gateway server 170 comprises a user-mode VPN authentication process 172 in which the gateway server 170 is configured (via configuration settings) to authenticate user access requests for connectivity to one or more servers 182, 184 of the remote network 180 based on fine-grained contextual information contained within an access request received from the user-mode VPN enabled applications 138 and 140. The user-mode VPN framework enables VPN authentication and authorization based on a finer granularity of authentication criteria including, e.g., contextual information regarding user, the computing device and/or the user-mode VPN enabled client application seeking access to the remote network 180.

In one embodiment of the invention, the user-mode VPN authentication process 172 implemented by the gateway server 170 performs an authentication process and an authorization process to authenticate and authorize an access request received from a user-mode VPN enabled client application requesting VPN connectivity. An authentication process is performed to authenticate an identity of an "endpoint." An endpoint can be the user, the computing device, a user-mode VPN enabled client application, or a combination thereof. Furthermore, an authorization process is performed to determine if the authenticated "endpoint" is authorized to access the remote network 180 based on the contextual information in the access request. In another embodiment of the invention, the user-mode VPN authentication process 172 of the gateway server 170 is configured to access a remote authentication server (not specifically shown in FIG. 9) and query the remote authentication server to perform authentication and authorization of the access request. In yet another embodiment of the invention, the gateway server 170 and remote authentication server can both share in the tasks of authentication and authorization.

Figure 10:
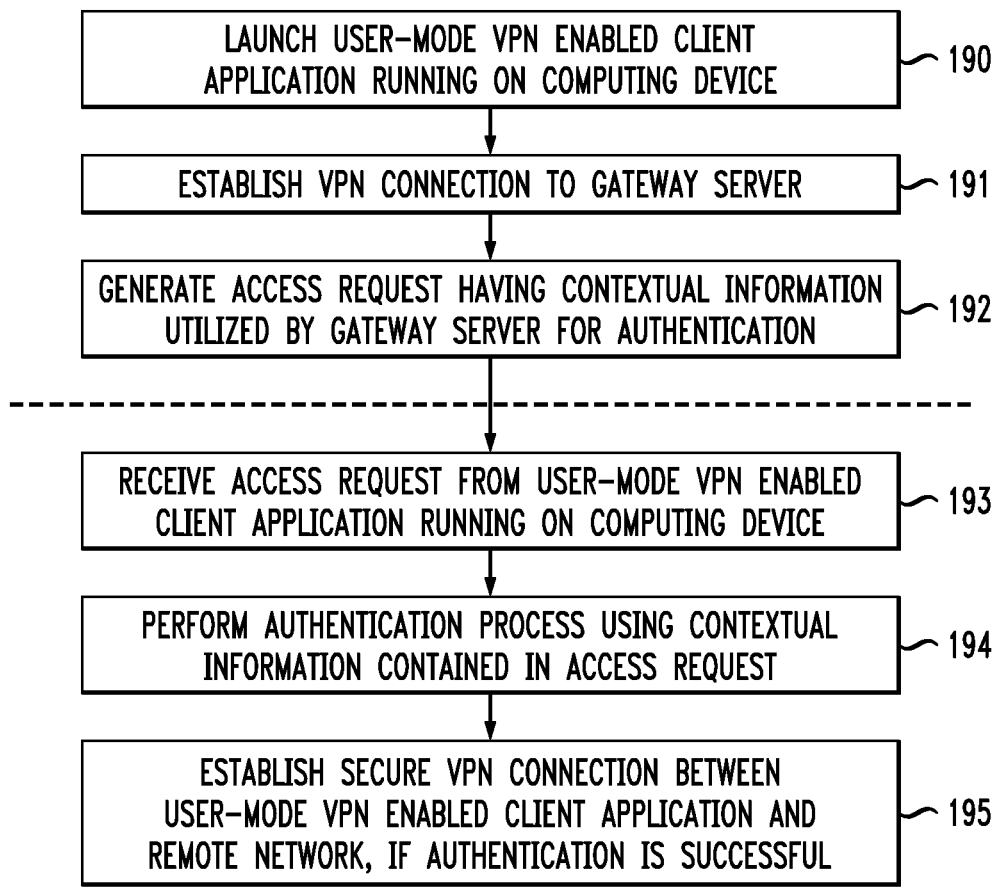
FIG. 10 is a flow diagram illustrating a method for authenticating virtual private network access requests according to an embodiment of the invention.

FIG. 10 is a flow diagram illustrating a method for authenticating virtual private network access requests according to an embodiment of the invention. By way of example, FIG. 10 illustrates an embodiment of an authentication process that is implemented using the system of FIG. 9. An authentication process shown in FIG. 10 comprises a first phase (steps 190, 191 and 192) that is implemented on the computing device 130 to generate a VPN access request that is sent to the gateway server 170, and a second phase (steps 193, 194 and 195) that is implemented on the gateway server 170 to authenticate and authorize a VPN access request received by a user-mode VPN enabled application running on the computing device 130.

Referring to FIG. 10, an initial step includes launching a user-mode VPN enabled client application on the computing device 130 (step 190). As shown in FIG. 9, the computing device 130 comprises a plurality of user-mode VPN enabled applications 138, 140 which can access applications, services, etc., supported by the VPN servers 182, 184 operating in the remote network 180. In accordance with an embodiment of the invention, authentication for the user-mode VPN enabled client applications 138 and 140 is performed on a per application basis in which the client applications 138 and 140 submit security credentials (in the form of contextual information included as part of an access request) to the gateway server 170 each time the client applications 138 and 140 are launched and request VPN connectivity to the remote network 180.

More specifically, after a user-mode VPN enabled client application 138, 140 is launched, a secure VPN connection is established to the gateway server 170 (step 191). In one embodiment of the invention, this process is performed by instantiating a user-mode VPN client 144 from program code of the user-mode VPN library 145 associated with the user-mode VPN enabled client application, and establishing a VPN connection using a process described above with reference to FIGS. 4 and 5, for example. Once the VPN connection is established, the user-mode VPN client 144 of the client application will send an access request to the gateway sever 170 for authentication (step 192). The access request comprises contextual information about the user, the computing device and/or the client application, which is used to authenticate and authorize the VPN access request. For instance, the contextual information about the user may include a username and a user password. The contextual information about the user may include a role of the user (e.g., administrator, user, application owner, etc.). Further, the contextual information about the client application includes an application identifier, wherein the identifier can identify an application type of the client application (e.g., e-mail client, instant messaging client application, etc.). The contextual information about the computing device may include a device identifier that identifies a device type of the computing device, or information regarding an operating system of the computing device, or location information regarding a location of the computing device. In other embodiments, the contextual information of an access request may include connection information regarding type of network connection, or information regarding a date or time of day or both.

Figure 11:
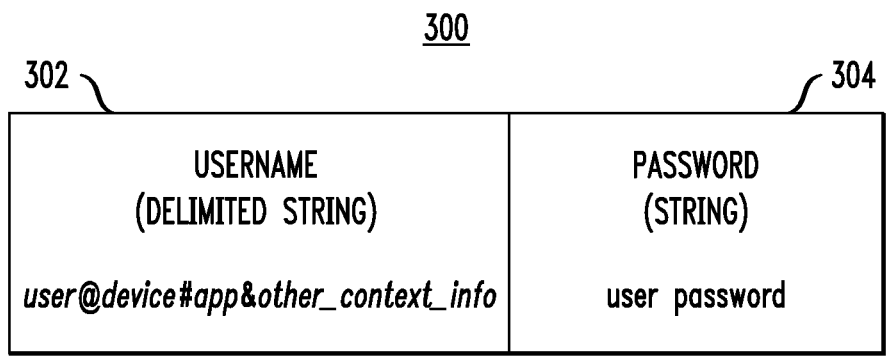
FIG. 11 illustrates a data structure of a virtual private network access request according to an embodiment of the invention.

In one embodiment of the invention, the contextual information of an access request can be encoded using a data structure as shown in FIG. 11. In particular, FIG. 11 illustrates a data structure 300 of a VPN access request according to an embodiment of the invention. The data structure comprises a first data block 302 and a second data block 304. The first data block 302 comprises a username in the form of a delimited string which includes contextual information about the user (user), the device (device), the client application (app), and other contextual information (other_context_info). The different types of contextual information are appended to each other and separated by unique delimiters. For, instance, the user contextual information (user) may be a user ID, which is separated from the device contextual information (device) by the "@" character. The client application contextual information (app) is separated from the device contextual information (device) by the "#" character. Additional contextual information (other_context_info) is separated from the client application contextual information (app) by the "&" character. The additional contextual information (other_context_info) may include one or multiple additional types of contextual information as discussed above, which are separated by unique delimiters. Other types of delimiting characters may be used to separate different types of contextual information appended to each other in the username string of the first data block 302 shown in FIG. 11, for example. The second data block 304 includes a user password.

Referring again to FIG. 10, the gateway server 170 will receive the access request generated and sent from the user-mode VPN enabled client application running on the computing device (step 193). The gateway sever 170 will perform an authentication and authorization process using the contextual information contained in the access request to authenticate the user (or other endpoint, e.g., device, application, user/device, user/application or user/device/application) and authorize the access request (step 194). A secure VPN connection will be established between the user-mode VPN enabled client application and the remote network 180, if the user (or other endpoint) is authenticated and the authenticated user (or other endpoint) is authorized to access the remote network (step 195).

In one embodiment of the invention, the gateway server 170 performs an authentication process by separating out the delimited contextual information contained in the access request, and comparing certain types of contextual information (e.g., user ID, device ID and/or application ID) contained in the access request against identity information obtained from an identity repository to authenticate the target endpoint (e.g., user). Moreover, in one embodiment of the invention, the gateway server 170 performs an authorization process by accessing one or more access control lists associated with the contextual information, and applying certain types of contextual information (contained in the access request) against the associated access control lists using known techniques to determine if the user (or endpoint) is authorized to access the remote network.

In another embodiment of the invention, authentication and authorization of a VPN access request can be performed using embodiments of systems and methods as disclosed in the above-incorporated U.S. patent application Ser. No. 13/743,313. In particular, this application discloses systems and methods for authenticating and authorizing network access requests using directory services (e.g., LDAP service) in which directory service authentication and authorization procedures are enhanced using the contextual information.

As will be appreciated by one skilled in the art, aspects of the present invention may be embodied as a system, apparatus, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium (s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIGS. 1-11 illustrate the architecture, functionality, and operation of possible implementations of systems, methods, and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Figure 12:
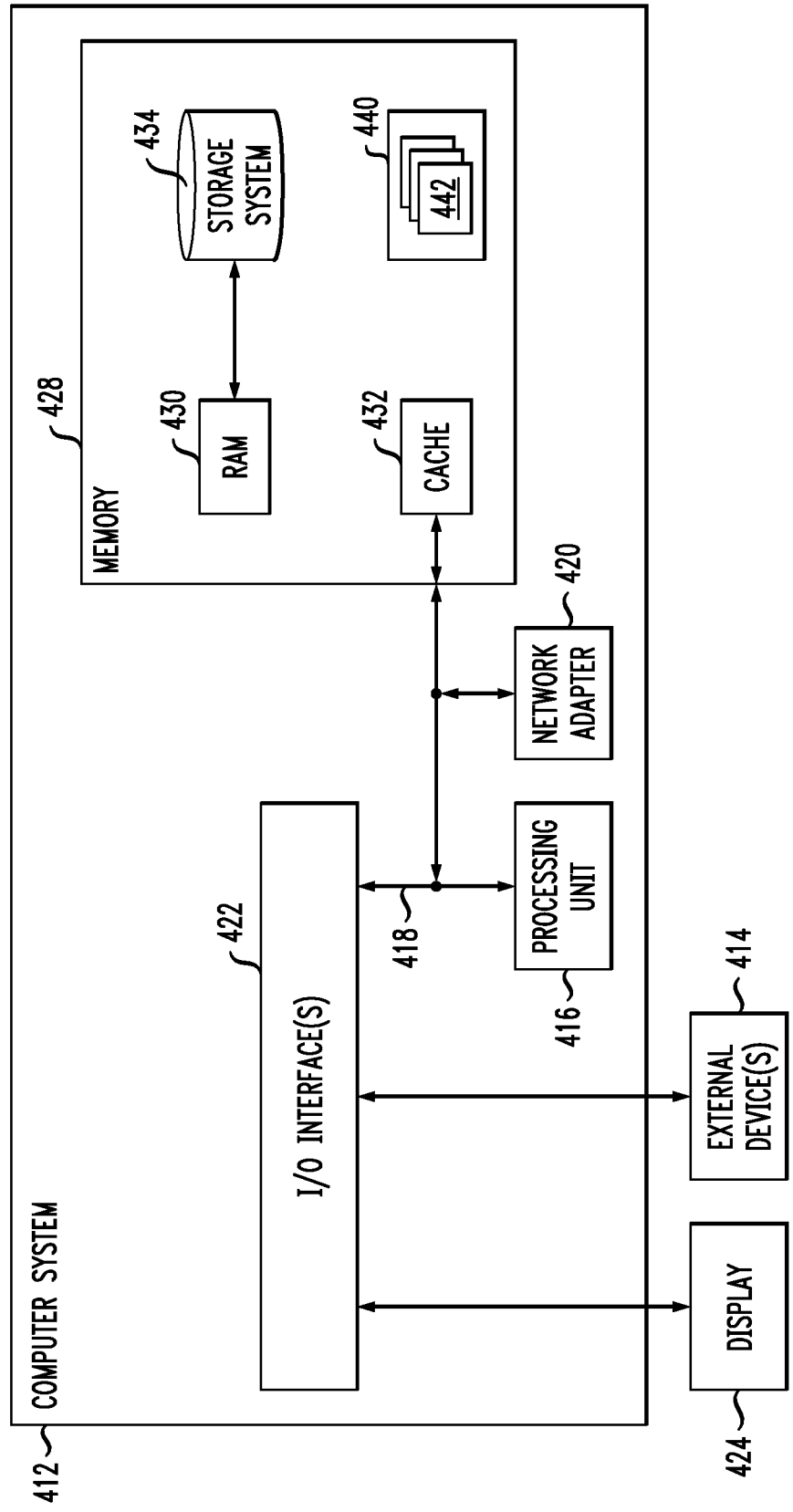
FIG. 12 illustrates a computer system in accordance with which one or more components/steps of the techniques of the invention may be implemented, according to an embodiment of the invention.

One or more embodiments can make use of software running on a general-purpose computer or workstation. With reference to FIG. 12, in a computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 412 in computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

The bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 412 typically includes a variety of computer system readable media. Such media may be any available media that is accessible by computer system/server 412, and it includes both volatile and non-volatile media, removable and non-removable media.

The system memory 428 can include computer system readable media in the form of volatile memory, such as random access memory (RAM) 30 and/or cache memory 432. The computer system/server 412 may further include other removable/non-removable, volatile/nonvolatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 418 by one or more data media interfaces. As depicted and described herein, the memory 428 may include at least one program product having a set (e.g., at least one) of program modules that are configured to carry out the functions of embodiments of the invention. A program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc., one or more devices that enable a user to interact with computer system/server 412, and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for controlling access to a virtual private network (VPN), comprising:
   receiving, by a gateway server, an access request from a user-mode VPN client of a user-mode VPN enabled client application running in non-privileged user space on a computing device for accessing a remote virtual private network,
      wherein the access request is received by the gateway server over a secure VPN connection that is established by the user-mode VPN client of the client application using a user-mode network protocol stack running in the non-privileged user space of the computing device, wherein the user-mode network protocol stack is separate from a native operating system network protocol stack of the computing device, wherein the user-mode VPN client exclusively executes in the non-privileged user space of the computing device without using privileged components of the native operating system of the computing device, and wherein the user-mode VPN enabled client application comprises embedded code comprising functions to implement the user-mode VPN client and the user-mode network protocol stack,
      wherein the access request comprises a username and a user password for use in authenticating a user to access the remote virtual private network, said username comprising, a combination of a user identifier and other contextual information appended to the user identifier, wherein the other contextual information comprises contextual information about the user-mode VPN enabled client application requesting access to the remote virtual private network;
   performing, by the gateway server, an authentication process to authenticate the user using said username in combination with said other contextual information appended to the user identifier, and said user password; and
   establishing, by the gateway server, a secure VPN connection between the user-mode VPN enabled client application and the remote virtual private network, if the user is authenticated.

2. The method of claim 1, wherein the contextual information about the user-mode VPN enabled client application comprises an application identifier.

3. The method of claim 2, wherein the application identifier identifies an application type of the user-mode VPN enabled client application.

4. The method of claim 1, wherein the other contextual information further comprises contextual information about the computing device.

5. The method of claim 4, wherein the other contextual information comprises a role of the user.

6. The method of claim 4, wherein the contextual information about the computing device comprises a device identifier that identifies a device type of the computing device.

7. The method of claim 4, wherein the contextual information about the computing device comprises information regarding the native operating system of the computing device.

8. The method of claim 4, wherein the contextual information about the computing device comprises location information regarding a location of the computing device.

9. The method of claim 1, wherein the other contextual information further comprises connection information regarding type of network connection.

10. The method of claim 1, wherein the other contextual information further comprises information regarding a date or time of day or both.

11. The method of claim 1, wherein the access request 1 comprises a data structure comprising a first data block and a second data block, wherein the first data block comprises the username in the form of a delimited string comprising the user identifier and the other contextual information separated by unique delimiters, and wherein the second data block comprises the user password.

12. The method of claim 1, wherein performing an authentication process using said username in combination with said other contextual information to authenticate the user comprises:
   accessing one or more access control lists; and
   processing the username in combination with said other contextual information of the access request against associated access control lists to determine if the user can access the remote network.

13. The method of claim 1, wherein the user-mode VPN client is launched by making functions calls to a VPN library of the user-mode VPN enabled client application, which is accessible in non-privileged user space of the computing device.

14. The method of claim 13, wherein the VPN library comprises the embedded code of the user-mode VPN enabled client application.

15. An article of manufacture comprising a non-transitory computer readable storage medium having program code embodied thereon, which when executed by a computer, performs a method for controlling access to a virtual private network (VPN), the method comprising:
   receiving, by a gateway server, an access request from a user-mode VPN client of a user-mode VPN enabled client application running in non-privileged user space on a computing device for accessing a remote virtual private network,
      wherein the access request is received by the gateway server over a secure VPN connection that is established by the user-mode VPN client of the client application using a user-mode network protocol stack running in the non-privileged user space of the computing device, wherein the user-mode network protocol stack is separate from a native operating system network protocol stack of the computing device, wherein the user-mode VPN client exclusively executes in the non-privileged user space of the computing device without using privileged components of the native operating system of the computing device, and wherein the user-mode VPN enabled client application comprises embedded code comprising functions to implement the user-mode VPN client and the user-mode network protocol stack, wherein the access request comprises a username and a user password for use in authenticating a user to access the remote virtual private network, said username comprising a combination of a user identifier and other contextual information appended to the user identifier, wherein the other contextual information comprises contextual information about the user-mode VPN enabled client application requesting access to the remote virtual private network;

performing, by the gateway server, an authentication process to authenticate the user using said username in combination with said other contextual information appended to the user identifier, and said user password; and establishing, by the gateway server, a secure VPN connection between the user-mode VPN enabled client application and the remote virtual private network, if the user is authenticated.

16. The article of manufacture of claim 15, wherein the contextual information about the user-mode VPN enabled client application comprises an application identifier.

17. The article of manufacture of claim 16 wherein the application identifier identifies an application type of the user-mode VPN enabled client application.

18. The article of manufacture of claim 15, wherein the other contextual information further comprises contextual information about the computing device.

19. The article of manufacture of claim 18, wherein the other contextual information comprises a role of the user.

20. The article of manufacture of claim 18, wherein the contextual information about the computing device comprises a device identifier that identifies a device type of the computing device.

21. The article of manufacture of claim 18, wherein the contextual information about the computing device comprises information regarding the native operating system of the computing device.

22. The article of manufacture of claim 18, wherein the contextual information about the computing device comprises location information regarding a location of the computing device.

23. The article of manufacture of claim 15, wherein the other contextual information further comprises connection information regarding type of network connection.

24. The article of manufacture of claim 15, wherein the other contextual information further comprises information regarding a date or time of day or both.

25. The article of manufacture of claim 15, wherein the access request comprises a data structure comprising a first data block and a second data block, wherein the first data block comprises the username in the form of a delimited string comprising the user identifier and the other contextual information separated by unique delimiters, and wherein the second data block comprises the user password.

26. The article of manufacture of claim 15, wherein performing an authentication process using said username in combination with said other contextual information to authenticate the user comprises:

accessing one or more access control lists; and processing the username in combination with said other contextual information of the access request against associated access control lists to determine if the user can access the remote network.

27. A gateway server for controlling access to a virtual private network (VPN), comprising:

a memory; and a processor coupled to the memory and configured to execute code stored in the memory for:

receiving, by the gateway server, an access request from a user-mode VPN client of a user-mode VPN enabled client application running in non-privileged user space on a computing device for accessing a remote virtual private network, wherein the access request is received by the gateway server over a secure VPN connection that is established the user-mode VPN client of the client application using a user-mode network protocol stack running in the non-privileged user space of the computing device, wherein the user-mode network protocol stack is separate from a native operating system network protocol stack of the computing device, wherein the user-mode VPN client exclusively executes in the non-privileged user space of the computing device without using privileged components of the native operating system of the computing device, and wherein the user-mode VPN enabled client application comprises embedded code comprising functions to implement the user-mode VPN client and the user-mode network protocol stack, wherein the access request comprises a username and a user password for use in authenticating a user to access the remote virtual private network, said username comprising a combination of a user identifier and other contextual information appended to the user identifier, wherein the other contextual information comprises contextual information about the user-mode VPN enabled client application requesting access to the remote virtual private network;

performing, by the gateway server, an authentication process to authenticate the user using said username in combination with said other contextual information appended to the user identifier, and said user password; and establishing, by the gateway server, a secure VPN connection between the user-mode VPN enabled client application and the remote virtual private network, if the user is authenticated.

* * * * *